(12) United States Patent
Bogenberger et al.

(10) Patent No.: US 9,061,589 B2
(45) Date of Patent: Jun. 23, 2015

(54) DISPLAY CONTROLLER, IMAGE PROCESSING SYSTEM, DISPLAY SYSTEM, APPARATUS AND COMPUTER PROGRAM PRODUCT

(75) Inventors: Florian Bogenberger, Poing (DE); Davor Bogavac, Kallered (SE)

(73) Assignee: Freescale Semiconductor, Inc., Austin, TX (US)

( * ) Notice: Subject to any disclaimer, the term of this patent is extended or adjusted under 35 U.S.C. 154(b) by 234 days.

(21) Appl. No.: 12/990,868

(22) PCT Filed: May 20, 2008

(86) PCT No.: PCT/IB2008/051976
§ 371 (c)(1),
(2), (4) Date: Nov. 3, 2010

(87) PCT Pub. No.: WO2009/141684
PCT Pub. Date: Nov. 26, 2009

(65) Prior Publication Data
US 2011/0057951 A1 Mar. 10, 2011

(51) Int. Cl.
G09G 5/02 (2006.01)
B60K 35/00 (2006.01)
G06F 3/14 (2006.01)
G09G 5/14 (2006.01)

(52) U.S. Cl.
CPC . *B60K 35/00* (2013.01); *G06F 3/14* (2013.01); *G09G 5/026* (2013.01); *G09G 5/14* (2013.01); *B60K 2350/1072* (2013.01); *B60K 2350/2056* (2013.01); *G09G 2330/12* (2013.01); *G09G 2340/12* (2013.01); *G09G 2380/10* (2013.01)

(58) Field of Classification Search
CPC .......................................................... G09G 5/14
USPC ........................................................ 345/629, 7
See application file for complete search history.

(56) References Cited

U.S. PATENT DOCUMENTS

| 5,784,036 A | 7/1998 | Higuchi et al. |
| 6,075,438 A | 6/2000 | Abe et al. |
| 6,597,367 B2 * | 7/2003 | Geisler ......................... 345/629 |
| 2008/0068399 A1 * | 3/2008 | Goss et al. .................... 345/629 |

FOREIGN PATENT DOCUMENTS

| DE | 102004055835 A1 | 2/2006 |
| DE | 102005023818 A1 | 11/2006 |
| EP | 0392824 A | 10/1990 |
| EP | 1729256 A | 12/2006 |

OTHER PUBLICATIONS

International Search Report and Written Opinion correlating to PCT/IB2008/051976 dated Feb. 18, 2009.

* cited by examiner

*Primary Examiner* — Ke Xiao
*Assistant Examiner* — Whitney Pointe

(57) ABSTRACT

A display controller includes a controller input connectable to receive first image data representing a non-safety relevant part of an image to be displayed on a display and to receive second image data representing a safety relevant part of the image. A merging unit is connected to the controller input, for composing the image from the first image data and second image data. A controller output is connectable to the display, for outputting display data representing the image. An image monitor is connected to the controller output, for comparing a part of the image corresponding to the safety relevant part with an reference for the part.

20 Claims, 2 Drawing Sheets

DISPLAY CONTROLLER, IMAGE PROCESSING SYSTEM, DISPLAY SYSTEM, APPARATUS AND COMPUTER PROGRAM PRODUCT

FIELD OF THE INVENTION

This invention relates to a display controller, to an image processing system, to a display system, to an apparatus and to a computer program product.

BACKGROUND OF THE INVENTION

Vehicle information and entertainment systems and consumer entertainment devices may employ sophisticated graphical schemes. A vehicle information and entertainment system may for instance display both safety relevant, such as the vehicle speed and engine temperature, and not safety relevant information, such as video or navigation information at the same time. For example, U.S. Pat. No. 5,784,036 discloses a display device for creating a display image in front of a vehicle's windshield. The display device includes a display controller which controls a display to show safety relevant information, such as vehicle speed and not safety relevant information such as audio system control switches, telephone control switches.

However, a disadvantage of this prior art system is that the display controller may generate a wrong image, for example due to a fault in the hardware or software of the display controller, which may result in a dangerous action of the person looking at the display in case the faulty parts of the image contain safety relevant information.

SUMMARY OF THE INVENTION

The present invention provides a display controller, an image processing system, a display system, an apparatus and a computer program product as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
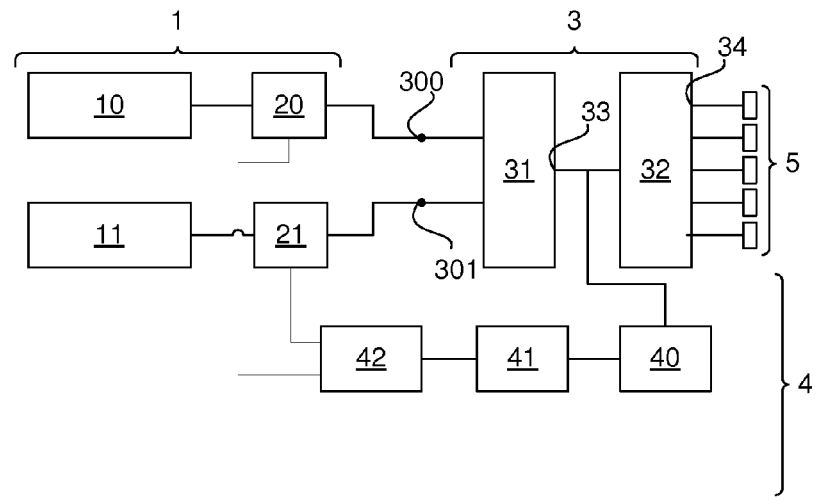
FIG. 1 schematically shows a block diagram of an example of an embodiment of a display system.

Referring to the example of FIG. 1, a display system is shown therein. The display system may, as shown, include one or more display controllers 3 which can provide image data to be displayed, in a for humans perceptible visual form, at a display 5. It will be appreciated that the display system 1 may include two or more display controllers and/or two or more displays. However, for sake of simplicity, in the example of FIG. 1 only one display controller 3 and one display 5 are shown.

The display controller 3 may include one or more controller inputs 300. At the controller input(s) 300,301 first image data representing one or more non-safety relevant parts of one or more images to be displayed on the display 5 may be received, as well as second image data representing one or more safety relevant parts of the image. The display controller may generate and output a sequence of images to the display 5.

The display controller 3 may include one or more merging units 31 connected to the controller input 300,301. The merging unit 31 may compose the image from the first image data and second image data, and generate display data representing the image. In the example of FIG. 1, the merging unit 31 is shown directly connected to the controller input 300,301. However, it will be apparent that the merging unit 31 may be indirectly connected to the controller input 300,301.

The display controller 3 may have one or more controller outputs 33,34. At the controller output 33,34 the display data or the data resulting from further processing of the merged display data may be outputted. In the example of FIG. 1, the display controller 3 includes a controller output 33 at which the display data generated by the merging unit may be outputted, and which in this example is directly connected to the merging unit 31.

As shown, the display controller 3 may further include an output 34 at which data resulting from further processing of the display data may be outputted. As shown in the example of FIG. 1, between the controller output 34 and the merging unit 31 other units may be present that process the display data generated by the merging unit 31, such as to a filtering unit 32 in this example, e.g. to the display 5 or (as shown in the example) other unit positioned, in a image processing direction, downstream of the merging unit 31 and connected to the output 34. One or more image monitors 4 may be connected to the controller output 33. The image monitor 4 may compare one or more parts of the image (as represented by the display data) corresponding to the safety relevant part with one or more reference for those parts. Thereby, it can be verified that safety relevant information is displayed as intended, and not e.g. hidden or masked by other information The first image data and second image data may be generated in any manner suitable for the specific implementation. The first image data and the second image data may be generated independent from each other. Thereby, for example, the generation of the safety relevant part can be implemented as sufficiently secure and safe, for example using a full or partial redundant image generating path connected to the merging unit 31. For the non-safety relevant part the generation may be implemented in a more simple manner, thereby reducing the complexity thereof. Accordingly, a more efficient system may be obtained.

Upstream, in the image processing direction, of the merging unit 31 other units may be present, which may form part of the display controller 3 or be connected to the display controller 3. For instance, as in the example of FIG. 1, the display controller 3 may be connected to an image generating system 1. The image generating system 1 may include a source 10 of not-safety relevant data and a second source 11 of safety relevant data. An image generation unit 20,21 may be connected to the first source and the second source. The image generation units 20,21 may generate first image data from the not-safety relevant data, the first image data representing a non-safety relevant part of an image to be displayed on a display and generate second image data from the safety relevant data, the second image data representing a safety relevant part of the image. As shown in FIG. 1, the image generating system 1 may be connected to the inputs 300,301 for outputting the first image data and the second image data to the display controller 3.

Figure 3:
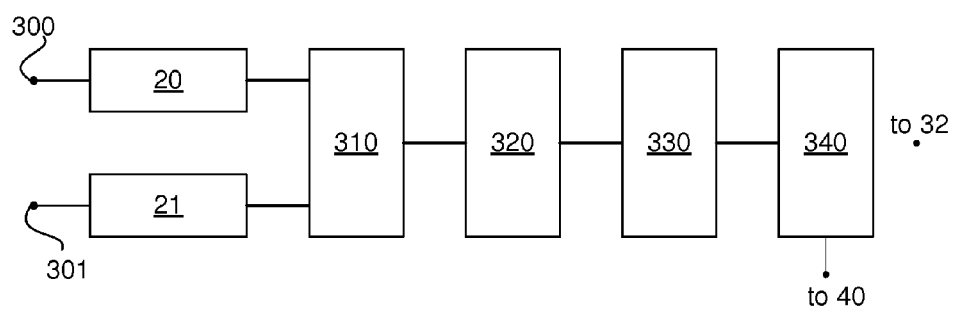
FIG. 3. schematically shows an example of an embodiment of an image processing chain.

As shown in FIG. 3, alternatively, the display controller 3 may include one or more image generation units 20,21. In FIG. 3, a first image generating path may connect the first controller input 300 to the merging unit 31 and a second image generating path may connect the second controller input 301 to the merging unit 31. As shown, each of the processing paths may include one or more image generation units 20,21 for generating respective image data. It will be apparent that the image generation units 20,21 or the controller inputs 300,301 may in turn be connected to a respective source of information, such as for example a sensor which measures a parameter value and which is used by the image processing unit to generate the respective image data. However, the sources may also be of other types such as one or more of: a sensor, a multimedia system, a communication network.

The first image data and the second image data may represent any suitable part of the image. For example, the image may be composed of two or more different layers, as generally known in the art of digital image editing. The display controller 3 may for example include one or more first controller inputs 300 connectable to receive first layer data representing one or more first layers of the image, the non-safety relevant part including the first layer. The display controller 3 may include one or more second controller inputs 301 connectable to receive second layer data representing one or more second layer of the image, the second layer including the safety relevant part. The merging unit 31 may then be connected to the first controller input 300 and the second controller input 301 and be able to merge the first layer and the second layer into the image and generating the display data.

The layers may be generated independent from each other and for example each contain an image with the same dimensions as the final image. The layers may be superimposed on each other or otherwise be formed into a stack which is then merged to obtain the image.

The merging unit 31 may support one or more safety mode in which the safety relevant part in the second layer is protected from being obscured. The second layer may for example be the top layer of the stack of layers. For example, the second layer may contain safety relevant parts only and be the top layer which, by default, is superimposed on the other layers when merging the layers. The merging unit 31 may be configured to always display the top layer, for example by overwriting for parts marked as non-transparent each and every layer below the top layer. Accordingly, the information in the safety relevant part will always be visible and accordingly safety may be enhanced as it is assured that faults in the non-safety relevant part do not interfere with the safety relevant part.

The second layer may include all the safety relevant parts. However, it will be apparent that the safety relevant parts may occupy only a part of the second layer 110 and the other parts of the second layer 110 may then be transparent. Thus, if the second layer is a top layer superimposed on the other layers, the part of the other layers covered by the transparent parts of the second layer 110 will be shown in the final image.

Figure 2:
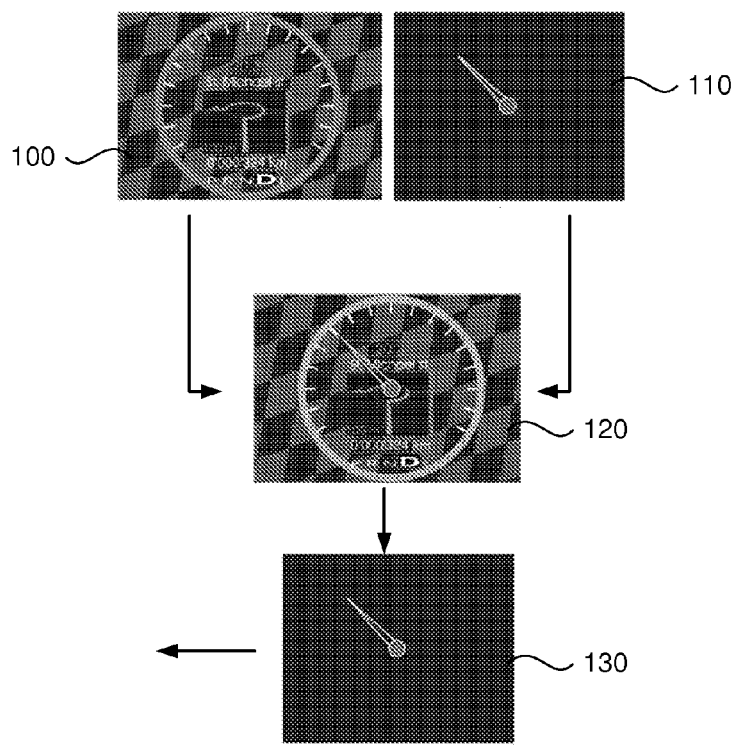
FIG. 2 schematically shows examples of image parts in successive stages of a method of generating an image.

Referring to FIG. 2, for example, the first layer 100 may form a background of the image whereas the second layer 110 may form the, varying, foreground of the image. In the example of FIG. 2, for instance, on the first layer 100 the not safety relevant parts of the image (such as in this example the information from a car navigation system, the amount of kilometres driven and the scale of the speedometer) are present. On the second layer 110 the safety relevant parts of the image are present, e.g. in this example the needle of the speedometer (hence the speed the indicator indicates). As shown, the layers 100,110 may be blended into the image 120 and the display controller 3 may control the display 5 to output the image 120.

The merging unit 31 may be implemented in any manner suitable for the specific implementation. The merging unit 31 may for instance include an image processing chain which can merge or blend the layers into the image. FIG. 3 schematically illustrates an example of an image processing chain able to merge two or more layers into an image. As shown in FIG. 3, the chain may include one or more processing stages. The chain may for example include one or more of: a converter 310, a block transfer unit 320, a gamma correction unit 330, a display driver 340 (in the shown example, the chain includes those units, seen in an image processing direction, in that order). As shown, the, in the image processing direction, most upstream stage, the converter 310 in this example, may be connected to a source, e.g. the image generation unit 20, of non-safety relevant data, i.e. of first layer data, and to a source, e.g. the image processing unit 21, of safety relevant data, i.e. of second layer data.

As shown, the first layer and the second layer may be merged in the converter 310. A merged image may then be outputted by the converter to a directly adjacent stage downstream of the converter 310, to a block transfer unit 320 in this example.

The block transfer unit 320 may transfer an image block into the merged image. The block transfer unit may for example provide a Bit-Block Transfer (BitBlt) function, as known in the art of image editing. The block transfer unit may output the resulting image to a directly adjacent stage downstream of the block transfer unit, to the gamma correction unit 330 in this example.

The gamma correction unit 330 may perform a digital gamma correction to the image and output a digital gamma corrected image to a directly adjacent stage downstream of the gamma correction unit 330, to the display driver 340 in this example. The display driver 340 may generate the display signals, suitable to be inputted to the display 5, based on the data received from the directly adjacent, upstream unit, the gamma correction unit 330 in this example. The display driver 340 may for instance generate analog signals with appropriate voltage levels and sufficient current as required for the display 5.

The display driver 340 may include in the display signals marking data which indicates one or more part of the image corresponding to the safety relevant part. The display driver again may derive this marking data from other marking data included originally by the safety relevant part of the image generation system 1 upstream of the display driver, such as the source 10 of not-safety relevant data or the second source 11 of safety relevant data. For instance, the display data may include values which define the intensity of the different colours of a pixel, e.g. RGB (Red, Green, Blue) values. For example, the display data may be include n-bit values for each of the respective colours and an additional bit may be added which indicates that the respective pixel is part of the safety relevant part of the image. However, the display data may also include other sets of graphical object data which define the image to be displayed.

As shown in FIG. 1, the display controller 3 may include a filtering unit 32 positioned between the merging unit 31 and the display 5. The filtering unit 32 may remove the marking data from the display data outputted by the display driver 340 and output the filtered display data to the display 5 at an output 34 of the display controller 3. For example, in case the safety relevant part of the image is marked by an additional bit to an n-bit signal, the filtering unit may comprise of n wires while the additional (n+1) bit is simply not transferred to the display 5. Thus, the filtering unit 32 may be of a very simple design, sufficient to filter the marking data from the display data. Furthermore, since the filtering unit 32 does not have information/processing capabilities, it is very unlikely that the filtering unit 32 changes or hides part of the image in a way that a user would not notice. Referring back to FIG. 1, as shown in this example, the image monitor 4 may include one or more calculators 41 which can calculate one or more signatures from display data representing one or more part of the image corresponding to the safety relevant part. The calculator 41 may be connected to the controller output 33.

The calculator 41 may receive from the controller output 33 at least the display data representing the part of the image corresponding to the safety relevant part. The calculator 41 may for example receive all the display data of an image or only of the part of the image corresponding to the safety relevant part. In the latter case, the signature calculation is independent from the generation of the non-safety relevant parts and may thereby be easier since the non-safety relevant parts may not be predictable or known at the time the safety relevant parts are produced. In addition, the reference can be calculated off-line since there is typically a limited set of possible parts of the image corresponding to the safety relevant parts. Furthermore, the amount of processing required may be reduced relative to calculating the signature from the complete image. For example, when the display driver 340 outputs marked display data, the image monitor 4 may include one or more filters 40 positioned between the output 33 and the calculator 41. The filter 40 may filter the display data representing the part of the image corresponding to the safety relevant part using the marking data. For example, when as explained above, the display data includes sets of pixel data, e.g. n-bits, each set defining one or more parameter of one or more pixel of the image, and the marking data includes one or more marking field in the set, e.g. an additional bit, corresponding to the safety relevant part, the filter may filter the marked pixels, e.g. take the pixels with the additional bit and input the filtered data into the calculator 41.

The calculator 41 may calculate the signature in any manner suitable for the specific implementation. The calculator 41 may for example calculate a hash code from the colour values of the pixels marked as safety relevant.

The image monitor 4 may include one or more signature comparators 42 connected to the calculator 41. The signature comparators 42 may compare one or more differences between the signature and one or more reference values with one or more criterion and output information about the comparison. For instance, the signature comparators 42 may compare a hash code calculated by the calculator 41 with a reference code which has been pre-calculated, for instance by an image processing unit. As shown in FIG. 1, the comparator 42 may for example be connected with respective inputs to the image generation units 20,21 or another source of reference code, such as a memory in which pre-calculated signatures are stored which have been determined off-line. The comparator 42 may receive from a predetermined reference signature, e.g. a hash code determined from at least the safety relevant part of the image. The calculator 41 may output a result, for example to a processing unit which may then take further action in case the signature and the reference value do not match sufficiently. For example, The calculator 41 may calculate multiple signature. For example, one or more first signatures may be calculated based on one or more first aspect of the safety relevant part, e.g. based on the location of the marked data in the image or the shape of the safety relevant part. The calculator may for example calculate a first hash code or other signature from the coordinates of the pixels represented by the marked data. Thus, for instance, when the marked data is present at a different location or with a different shape than expected, this fault (that can be caused in the chain up to the filter 40) can be detected.

The calculator 41 may calculate one or more second signatures based on one or more second aspect of the safety relevant part, for example from the content of the safety relevant part. For example, the calculator 41 may calculate a hash code or other signature from the colours of the pixels in the safety relevant part.

Figure 4:
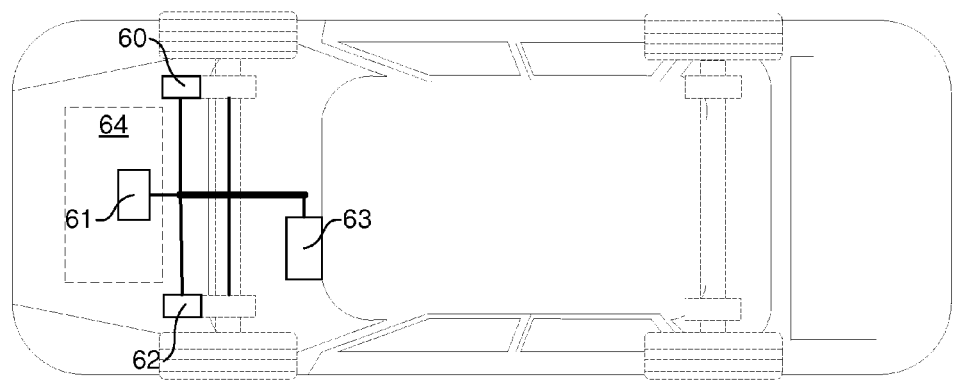
FIG. 4 schematically shows a top view of an example of an embodiment of an apparatus in which the examples of FIGS. 1-2 may be applied.

The image generating system and the display system may be used in an apparatus, for example in a vehicle such as a car, to convey information to a user at the display. Referring to FIG. 4, for example, a vehicle is shown. The vehicle may include sources of safety relevant information and non-safety relevant information such as a speed sensor 60,62 which can measure the speed of the vehicle and a tachometer 61 which can measure the revolutions per minute of an engine 64. As shown, the sources may be connected to a image generating and display system 63 which may for example be implemented as shown in FIG. 1.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-rom or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

Also, for example, in order to check that the monitor is working (not frozen) the image can be changed in invisible ways (e.g. change a pixel brightness by one level)—which should result in different signatures.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, e.g. in order to achieve the independence of safety-relevant and non-safety-relevant components as required by safety standards, while functionally operating as a single device. For example, the display controller 3 may be implemented as different dies integrated in a single or multiple packages. Also, devices functionally forming separate devices may be integrated in a single physical device. For example, the system 1 may be implemented as a single die integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'one or more', and do not exclude a plurality. The mere fact that certain measures are recited in mutually different claims does not indicate that a combination of these measures cannot be used to advantage.

The invention claimed is:

1. A display system, comprising:
   an input to receive first image data, representing a first part of an image to be displayed on a display device, and second image data, representing a second part of the image to be displayed;
   a display control unit coupled to the input to generate a third image data, based on the first and second image data, representing a combination of the first and second parts of the image, and to generate a display signal, based on the third image data, to be provided to the display device as the image to be; and
   an image monitoring unit coupled to the input to receive the second image data and coupled to the display control unit to receive the third image data, the image monitoring unit to compare information based on the second image data with information based on the third image data to verify that the second part of the image to be displayed is represented in the third image data, wherein the information based on the second image data is not based on the third image data.

2. A display system as claimed in claim 1, wherein:
   the first part of the image is a non-safety relevant part of the image to be displayed;
   the second part of the data is a safety relevant part of the image to be displayed; and
   said display control unit supports a safety mode in which said safety relevant part in the second image data is protected from being obscured.

3. A display system as claimed in claim 1, wherein said third image data includes marking data indicating a part of said third image data corresponding to said second part of said image and wherein said image monitoring unit verifies the second part of the image to be displayed based on third image data identified using said marking data.

4. A display system as claimed in claim 3, wherein said third image data includes sets of graphical object data, each set defining at least one parameter of a graphical object of said image, and wherein said marking data includes a marking field in sets of graphical object data corresponding to said second part of said image.

5. A display system as claimed in claim 1, wherein said image monitoring unit comprises:
   a calculator to calculate a first signature representing the information based on the second image data, said calculator being coupled to said display control unit to receive at least the third image data representing the second part of said image to be displayed; and
   a signature comparator coupled to said calculator, to compare a difference between the first signature and a reference value with a criterion and to output information about said comparison.

6. A display system as claimed in claim 5, wherein the first signature comprises a first signature based on a first aspect of the second part of said image and a second partial signature based on a second aspect of the second part of said image.

7. A display system as claimed in claim 6, wherein the first aspect is selected from one or more of a location and a shape of the second part of said image and the second aspect is derived from a content of the second part of said image.

8. An image generating system, comprising:
   a first source of not-safety relevant data;
   a second source of safety relevant data;
   an image processing unit coupled to said first source and said second source, said image processing unit to generate first image data from the not-safety relevant data, said first image data representing a non-safety relevant part of an image to be displayed on a display, and to generate second image data from said safety relevant data, said second image data representing a safety relevant part of said image; and
   an output connected to said image processing unit, to output said first image data and said second image data to a display system as claimed in claim 1.

9. An image generating system as claimed in claim 8, further comprising a calculator coupled to said image processing unit to calculate a reference value for said second image data part.

10. An image generating system as claimed in claim 8, wherein said first source is one of: a sensor, a multimedia system, and a communication network, and said second source is one of: a sensor, a multimedia system and a communication network.

11. The display controller of claim 8, wherein the safety relevant data is system variable data.

12. The display controller of claim 11, wherein the non-safety relevant data is a static background image.

13. A method, comprising:
   receiving at a display system first image data representing a first part of an image to be displayed on a display device;
   receiving at the display system second image data representing a second part of the image to be displayed;
   generating a third image data, based on the first image data and the second image data, representing a combination of the first and second parts of the image;
   transmitting a display signal based on the third image data for reception at a display device; and
   comparing information based on the second image data with information based on the third image data to verify that the second part of the image to be displayed is represented in the third image data, wherein the information based on the second image data is not based on the first image data.

14. The method of claim 13, further comprising:
   protecting the second part of the image from being obscured in the third image data.

15. The method of claim 13, wherein the third image data includes marking data indicating a location of the second part of the image to be displayed, further comprising:
   selecting the second part of the image to be displayed from the third image data, wherein the selection uses the marking data.

16. The method of claim 13, further comprising:
determining the information based on the second image data by calculating a first signature;
wherein verifying comprises:
computing a difference between the first signature and a reference value;
comparing the difference with a criterion; and
outputting information about the comparison.

17. The method of claim 16, wherein calculating the first signature comprises:
calculating a first partial signature based on a first aspect of the second part of the image; and
calculating a second partial signature based on a second aspect of the second part of the image.

18. The method of claim 17, wherein:
the first aspect is based on one or more of a location and a shape; and
the second aspect is based on a content.

19. The method of claim 13, further comprising:
displaying the image on the display device.

20. The method of claim 13, wherein no digital data processing is performed in generating the display data from the third image data.

\* \* \* \* \*